United States Patent [19]

Satoh et al.

[11] 4,404,171

[45] Sep. 13, 1983

[54] TOWER FOR DRYING GASEOUS CHLORINE

[75] Inventors: Hiroaki Satoh; Yasuyuki Tabata; Kouichi Gomikawa, all of Tokyo; Masaru Hiruta, Iwaki, all of Japan

[73] Assignee: Kureha Kagaku Kogyo Kabushiki Kaisha, Tokyo, Japan

[21] Appl. No.: 312,150

[22] Filed: Oct. 16, 1981

[30] Foreign Application Priority Data

Oct. 28, 1980 [JP]  Japan ................................ 55-151079

[51] Int. Cl.³ ............................................ B01J 19/02
[52] U.S. Cl. .................................. 422/241; 252/511; 261/94; 264/105; 361/212; 361/215
[58] Field of Search ............... 252/511, 502; 423/478; 220/457; 204/98, 128; 422/241, 240; 174/47; 361/212, 215; 261/94, 114 R; 264/105; 106/99

[56] References Cited

U.S. PATENT DOCUMENTS

| | | | |
|---|---|---|---|
| 3,406,126 | 10/1968 | Litant | 252/511 |
| 3,671,285 | 6/1972 | Prescott | 252/511 |
| 3,733,385 | 5/1973 | Reddish | 264/105 |
| 3,941,918 | 3/1976 | Nigol et al. | 106/99 X |
| 4,120,325 | 10/1978 | de Patte | 361/215 |
| 4,265,789 | 5/1981 | Christopherson et al. | 252/511 |

FOREIGN PATENT DOCUMENTS

| | | |
|---|---|---|
| 1000792 | 1/1957 | Fed. Rep. of Germany . |
| 2395660 | 1/1979 | France ................................ 252/511 |
| 50-18702 | 2/1975 | Japan ................................. 252/511 |
| 1271521 | 4/1972 | United Kingdom . |
| 1570240 | 6/1980 | United Kingdom . |

Primary Examiner—Richard L. Chiesa

[57] ABSTRACT

The present invention relates to a tower for drying gaseous chlorine, in which a high polymeric composite material containing carbon fibers and electroconductive carbon black as the whole or a part of the reinforcing material and the material for giving electroconductivity is used as a wall material thereof for removing static electricity generating within the tower.

5 Claims, 12 Drawing Figures

TOWER FOR DRYING GASEOUS CHLORINE

BACKGROUND OF THE INVENTION

In the process of electrolyzing sodium chloride in diaphragm cells, gaseous hydrogen simultaneously generating with the electrolysis due to, for instance, partial exfoliation of fragile asbestic diaphragm contaminates gaseous chlorine to form a chlorine-hydrogen detonating gas and the gas explodes by a certain cause. Almost all the causes of such an explosion of the chlorine-hydrogen detonating gas are due to the discharge of static electricity accumulated within the tower installed for drying the gaseous chlorine from the cells.

Since in the process of electrolyzing sodium chloride, simultaneously with the generation of chlorine, gaseous hydrogen also generates on the other hand, risk of explosion is always present, and many accidents of explosion have been reported from the factories of electrolysis of sodium chloride in several districts.

That the cause of these explosions is the discharge of accumulated static electricity is supported by the repeatedly detected electrical charge of ⊕100 to 1000 V at the top of the tower made of polyvinyl chloride for drying gaseous chlorine and ⊖5000 V in the lower space of the tower where sulfuric acid flows down during the survey on static electrical charge in the tower in operation.

Seeing that such an electrical potential is present, it is presumed that the risk of spark discharge is always present and an accident of explosion is easily caused in the case where such a detonating gas within the explosion limits is co-existent with the risk.

As a means for preventing this kind of accidents, the following means have been hitherto adopted actually:

(1) An apparatus for continuously determining hydrogen in the industrial aqueous chlorine is provided, and the operation of the process is strictly administered to maintain the gaseous hydrogen in the gaseous chlorine under the standard for security.

(2) To have a construction of the top of the drying tower of gaseous chlorine and of the pipings not to cause the separation and accumulation of gaseous hydrogen.

(3) To provide earth-pieces made of tantalum, etc. with the tower and the pipings for gaseous chlorine.

(4) A elecctroconductive paint is painted on the whole surface of the outer wall of the tower for drying gaseous chlorine made of polyvinyl chloride and several copper hoops are installed on the thus painted surface with a suitable distance between them, and the tower is electrically grounded as a whole.

However, there is a possibility of the occurrence of unexpected accident of explosion due to the incomplete function of the determining apparatus by some troubles, and even if the concentration of hydrogen on the average in the whole process will be checked by the apparatus, a very much complicated and expensive system of determination is necessary for suppressing the partial and sudden raise of the concentration of hydrogen completely.

In addition, as will be clearly understood from Examples described later, sulfuric acid falling as droplets in the dried gaseous chlorine is highly charged with positive electricity, and the wall of the drying tower made of polyvinyl chloride is negatively charged.

Even by providing an electroconductive layer around the outer surface of the wall of the drying tower made of polyvinyl chloride for removing these electric charges, the effect of preventing the accidents of explosion cannot be expected.

Accordingly, an offer of the tower for drying gaseous chlorine, which is anti-corrosive against concentrated sulfuric acid and gaseous chlorine and is electroconductive not to accumulate static electricity has been demanded for removing the static charge within the tower to prevent the accident of explosion and to carry out the safe drying of gaseous chlorine.

As a result of their enthusiastic studies, the present inventors have found that by using a high polymeric composite material based on a resin selected from thermoplastic resins such as polypropyrene, polyvinyl chloride, etc. or thermosetting resins such as phenol resins, etc. as a matrix and containing 10 to 30% by weight of carbon fibers and 5 to 20% by weight of electro-conductive carbon black, that is, containing 15 to 50% by weight of total carbonaceous material as the wall material for the tower for drying gaseous chlorine and further by grounding the material, it is posible to effectively remove the static charge of the tower for drying gaseous chlorine generating from the electrolysis of sodium chloride.

Namely, the object of the present invention lies in offering a tower for drying gaseous chlorine for which a high polymeric composite material containing carbon fibers and electroconductive carbon black as the reinforcing material and the material for giving electroconductivity is used as a wall-forming material having a function of removing static charge which generates within the tower.

BRIEF EXPLANATION OF THE DRAWINGS

Of the attached drawings.

DETAILED DESCRIPTION OF THE INVENTION

The present invention relates to a tower for drying gaseous chlorine, in which a high polymeric composite material containing carbon fibers and electroconductive carbon black as the reinforcing material and the material for giving electroconductivity is used as a wall material for removing static charge generating within the tower.

More in detail, the present invention relates to a tower for drying gaseous chlorine generating from electrolysis of sodium chloride, in which a high polymeric composite material based on a resin selected from the group consisting of thermoplastic resins such as polypropylene, pokyvinyl chloride, etc. or of thermosetting resins such as phenol resins, etc. as a matrix and containing 10 to 30% by weight of carbon fibers and 5 to 20% by weight of electroconductive carbon black, that is, containing 15 to 50% by weight of total amount of carbonaceous material is used as the wall material of the tower.

The present invention will be concretely explained while referring to FIGS. 1 and 12 as follows.

Figure 1:
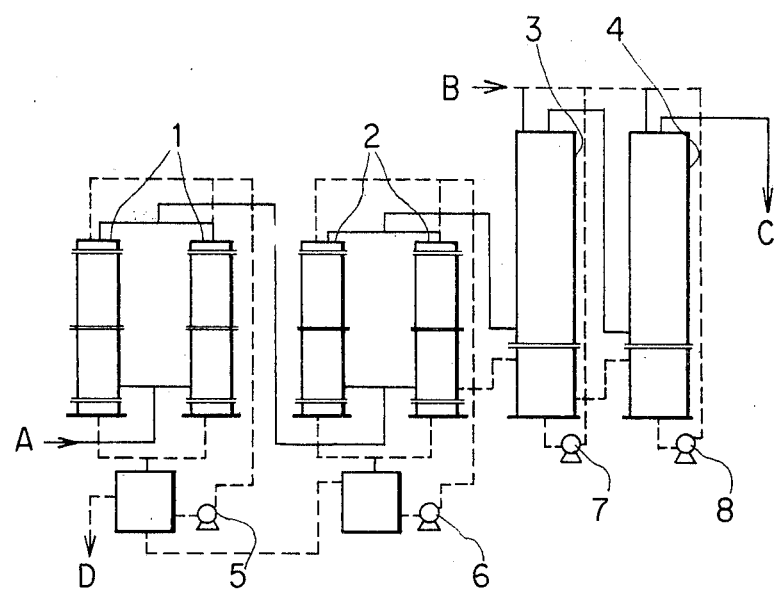
FIG. 1 shows the overall process flow chart of drying gaseous chlorine according to the present invention.

The tower for drying gaseous chlorine according to the present invention is used for drying gaseous chlorine produced by electrolysis of sodium chloride with concentrated sulfuric acid supplied into the tower, and the whole process of drying is illustrated in FIG. 1.

In FIG. 1, 1 to 4 are respectively the towers for drying gaseous chlorine and 5 to 8 are respectively the pumps for circulating concentrated sulfuric acid. Further in FIG. 1, A, B, C and D respectively show the solid line for introducing gaseous chlorine, the dotted line for introducing concentrated (to 98%) sulfuric acid, the line for transferring gaseous chlorine discharged from the tower for drying to the chlorine condenser and the dotted line for discharging waste (to 65%) sulfuric acid.

Figure 2:
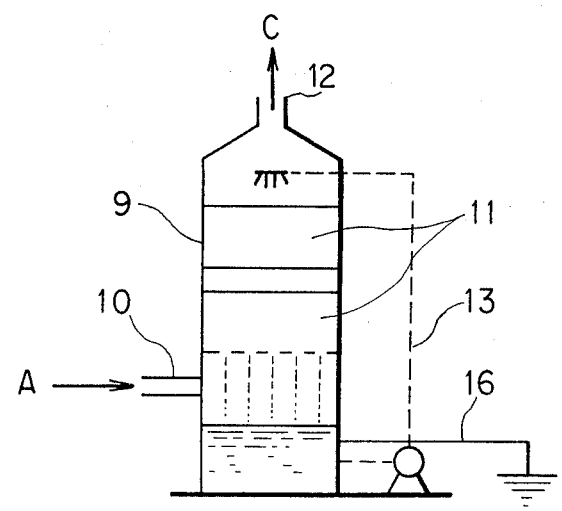
FIG. 2 shows the detailed explanatory chart of the tower for drying gaseous chlorine.

FIG. 2 shows the construction of the tower in FIG. 1, and in FIG. 2, 9 is the wall of the tower, comprising the high polymeric composite material; 10 is the inlet of gaseous chlorine into the tower for drying; 11 is the layers of packings for gas-liquid contact such as Raschig rings; 11 is the outlet of dried gaseous chlorine; 13 is the line for circulating concentrated sulfuric acid and 16 shows the grounding terminal.

In addition, according to the present invention, the tower may be constructed altogether with the composite material according to the present invention, however, the tower constructed with the conventional material without any electroconductivity such as polyvinyl chloride may be lined with the internal wall comprising the composite material according to the present invention. Moreover, in the case where packings made of the composite material containing electroconductive substance, for instance, carbon fibers are used for gas-liquid contact, it is more effective from the view point of the countermeasure in removing static charge generating within the tower.

Figure 3:
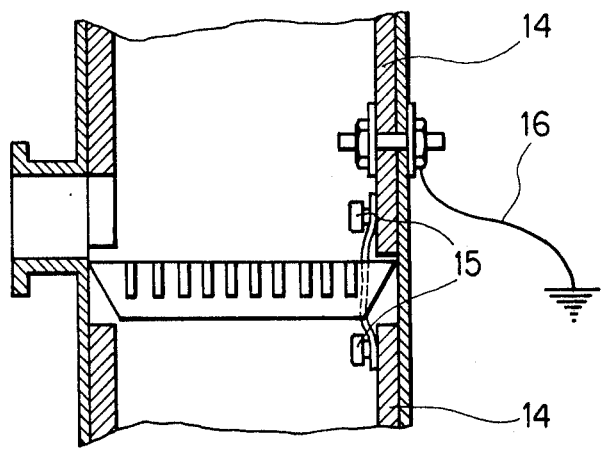
FIG. 3 shows a cross-sectional view of the tower for drying gaseous chlorine, in which an internal lining wall comprising the high polymeric composite material according to the present invention is provided.
Figure 4:
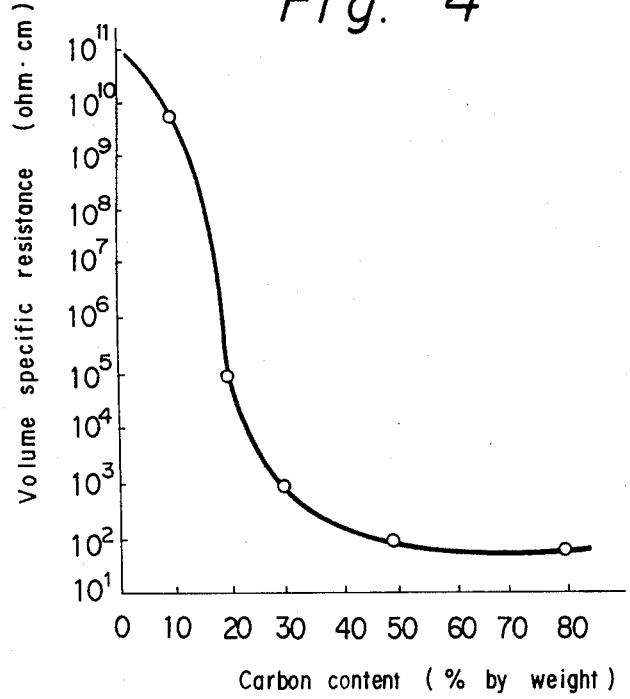
FIG. 4 shows a diagram illustrating the relationship between the content of carbon black and the volume specific resistance of the resin containing the added carbon black.

FIG. 3 is an example of installing the internal wall and in FIG. 13, 14 is the internal wall comprising the composite material of carbon fibers-high polymeric substance; 15 is an electric connector of the upper internal wall and the lower internal wall and 16 shows the grounding terminal.

Since in the tower for drying gaseous chlorine, as a matter of course, the material composing the wall of the tower is in contact with concentrated sulfuric acid and gaseous chlorine, a sufficient corrosion-resistance against these substances is required to the material, and the by-production of hydrogen upon reacting with concentrated sulfuric acid should not occur.

The material which fulfills such requirements and still gives electroconductivity to the resin is highly restricted. For instance, carbon black is considered to be suitable, however, since the volume specific resistance of the electroconductive high polymeric composite material generally used in the countermeasure for static charge is $10^3$ to $10^6$ ohm.cm, the necessary content of such a material is 20 to 30% by weight in the case of carbon black as clearly seen in FIG. 4. The resin used to obtain the data of FIGS. 4–8 was polypropylene containing 10% by weight of modified polypropylene.

Figure 5:
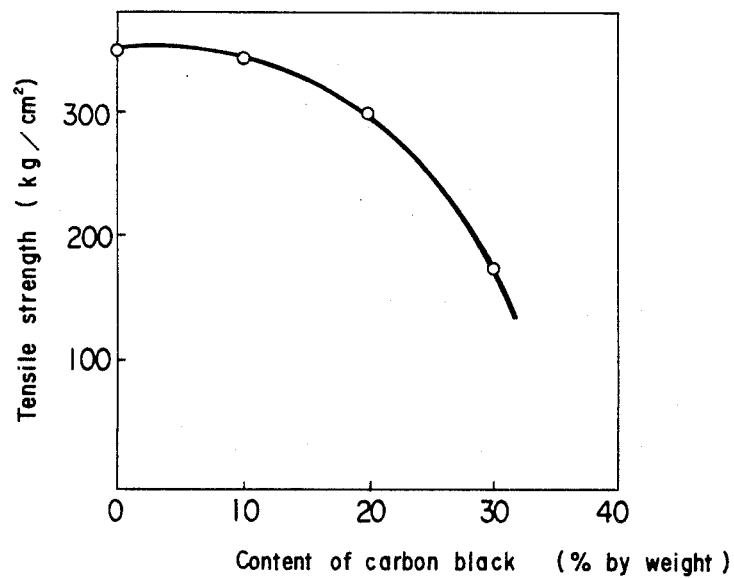
FIG. 5 shows a diagram illustrating the relationship between the content of carbon black and the tensile strength of the resin containing the added carbon black.

On the other hand, FIG. 5 shows the relationship between the content of carbon black in percentage by weight in polypropylene and the tensile strength of polypropylene containing carbon black, and as is clearly seen in FIG. 5, the tensile strength is remarkably reduced in the case where the content of carbon black exceeds 10% by weight. Moreover, particularly in the atmosphere within the tower for drying gaseous chlorine, in which corrosion by chlorine and concentrated sulfuric acid is severe, the deterioration of such a material is so much that there occurs inconvenience of the reduction of the endurance of the material as the material for constructing the apparatus.

Figure 6:
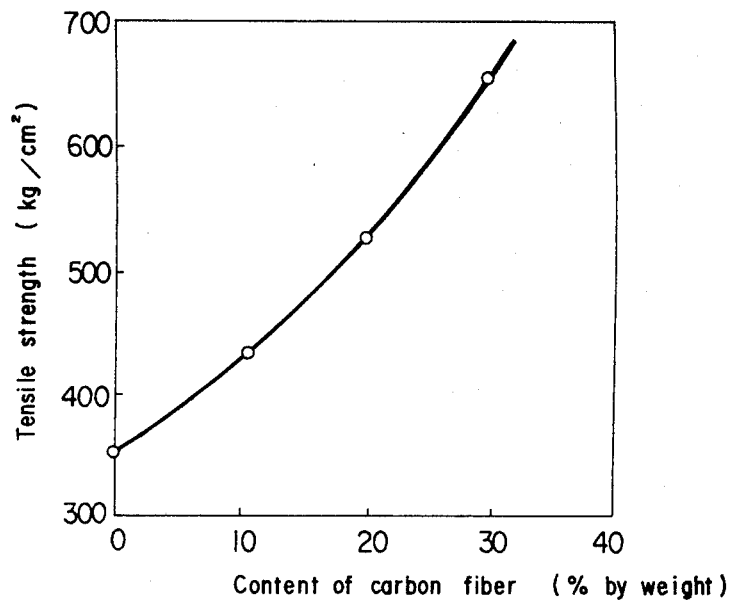
FIG. 6 shows a diagram illustrating the relationship between the content of carbon fibers and the tensile strength of the resin containing the added carbon fibers.
Figure 7:
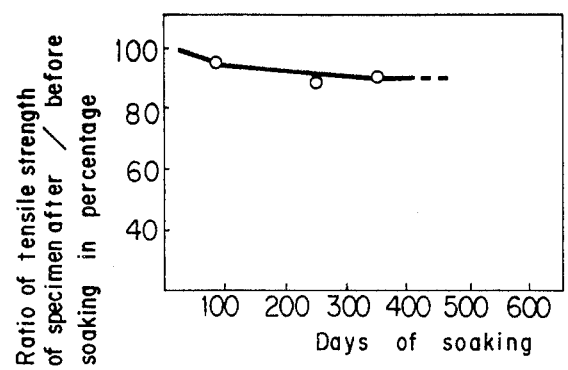
FIG. 7 shows a diagram illustrating the days during which the composite material according to the present invention was immersed in the anode chamger of electrolysis and the rate of maintaining the tensile strength of the composite material.

On the other hand, in the case of a composite material prepared by mixing carbon fibers with polypropylene containing 10% by weight of modified polypropylene (the material being referred hereinafter to as CFRPP), the relationship between the content of carbon fibers, % by weight, and the tensile strength of the material indicates, as is shown in FIG. 6, the attainment of the large improvement of its tensile strength while showing the sufficiently usable physical property as a material for constructing the wall of the tower for drying chlorine.

According to the results of anti-corrosion tests carried out by placing the composite material comprising polypropylene, modified polypropylene and carbon fibers (CFRPP) in an atmosphere of gaseous chlorine at a high temperature of about 100° C. within an anode-chamber of a diaphragm cell for electrolysis of sodium chloride, even after one year of placing, the tensile strength of the specimen was 93% of the original tensile strength of the specimen, which verifies the sufficient corrosion-resistance of the material of the present invention.

Figure 8:
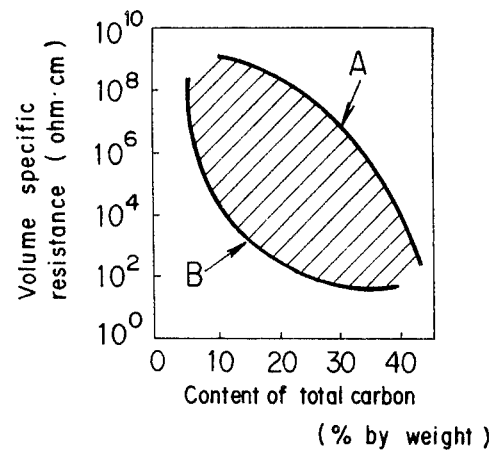
FIG. 8 shows a diagram illustrating the relationship between the percentage by weight of the content of carbon fibers plus carbon black in the composite material and the volume specific resistance of the composite material containing the same.

The electroconductivity of CFRPP is shown in FIG. 8 by its volume specific resistance (ohm.cm). In FIG. 8, line A shows the relationship between the volume specific resistance of the specimens containing the carbon fibers with a relatively short fiber length of about 0.6 micron and the content of the carbon fibers in the specimens. In cases where the length of the carbon fiber becomes larger, the volume specific resistance becomes smaller at the same content of the carbon fibers, for instance, the specimen prepared by incorporating the carbon fibers of 3 microns in average showed the value of volume specific resistance of about one hundredth of that of the specimen containing the same amount of the carbon fibers of 0.6 micron in average length.

Line B in FIG. 8 shows the same relationship on the specimens prepared by using a carbon black of a relatively large specific surface area of at least 800 m$^2$/g in an amount of 50% by weight of the total carbonaceous substance (the carbon black was made by Lion Aczo Co. under the trade name ®: Ketchen Black E.C.)

Namely, in the experience of the present inventor, the product (CFRPP) showing the above-mentioned relationship within the range shown by the oblique linear lines can be produced.

Of the afore-mentioned resins usable for preparing the high polymeric composite material according to the present invention, polypropylene is most preferable in practice from the view points of economy and processability. Besides, in order to maintain the stability of the material for a long time period, it is necessary to improve the compatibility of the resin with the carbon fibers and with carbon black. For improving the compatibility, it is preferable to mix 5 to 25% by weight of a modified polypropylene with 95 to 75% by weight of polypropylene. The modified polypropylene is prepared by copolymerizing propylene and an unsaturated carboxylic acid of 3 to 10 carbon atoms. Also, the modified polypropylene is prepared by treating polypropylene with the unsaturated carboxylic acid.

The situations of accumulation and removal of static change in a system in which concentrated sulfuric acid flows down along a inclined duct made of the composite material, CFRPP or polyvinyl chloride, will be explained as follows while referring to the experiments carried out in the system shown in FIG. 9.

Figure 9:
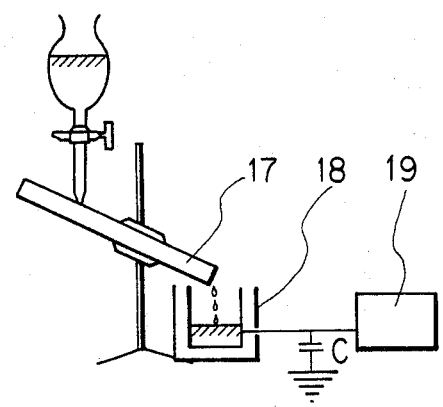
FIG. 9 shows the explanatory figure of the experiment in which concentrated sulfuric acid is charged electrically by falling down.

In FIG. 9, 17 is a semicylindrical shoot made of CFRPP or polyvinyl chloride of one inch internal diameter and 1 m in length set at an inclination by 45°, and concentrated (98%) sulfuric acid was let flow in the shoot 17 as droplets of about 2 mm in diameter continuously. 18 is a Faraday gage to receive sulfuric acid, and the amount of electricity of the thus received sulfuric acid was determined by the electrometer 19. The results of determination are shown in Table 1.

TABLE 1

| Material of the shoot | Amount of cumulated charge per droplet of conc. sulfuric acid (coulomb) |
|---|---|
| Polyvinyl chloride | $1.6 \times 10^{-10}$ |
| CFRPP | $5.0 \times 10^{-11}$ |

In this connection, the composition of CFRPP used in the experiment was that containing 10% by weight of carbon fibers and 10% by weight of Ketchen Black E.C. as a representative specimen of those shown in the abscissa of FIG. 8.

As is seen in Table 1, the amount of cumulated charge in sulfuric acid flowed down the shoot made of CFRPP was about one third of that in sulfuric acid flowed down the shoot made of polyvinyl chloride.

Figure 10:
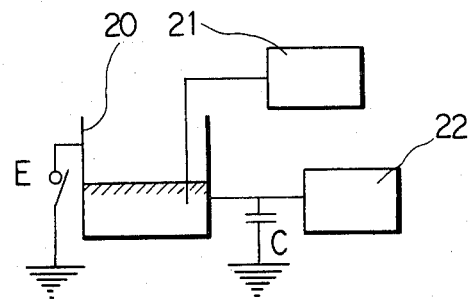
FIG. 10 shows the explanatory figure of the experiment of removing the electrical charge of concentrated sulfuric acid.

Although the situation of generation and accumulation of static charge in the above-mentioned system was shown by the above-mentioned experiments, it is necessary to discuss the situation of removel of the accumulated static charge with that of generation and accumulation of static charge in considering the static electrical phoenomenon between concentrated sulfuric acid and the material of the tower wall. The removal of the accumulated charge on sulfuric acid was carried out in the following experiments in a system shown in FIG. 10.

Figure 11:
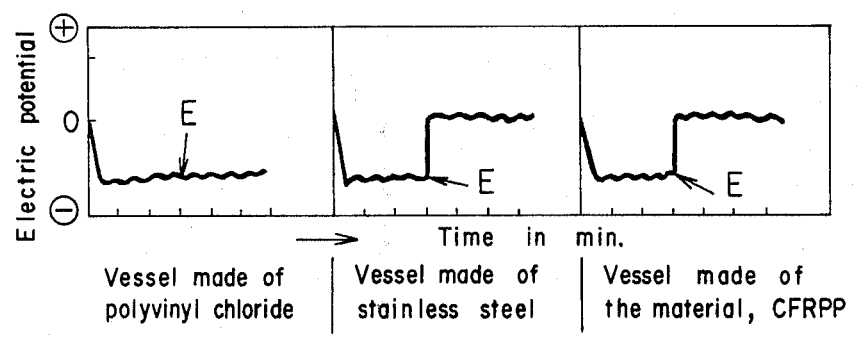
FIG. 11 shows the explanatory figure of the experiment of removing electrical charge from the model tower for drying gaseous chlorine and FIG. 12 shows the figure illustrating a model plant according to the present invention.

The vessel 20 of the dimensions of 30×30×30 cm made of polyvinyl chloride, CFRPP or 18-8 chromium-nickel stainless steel was used as the storage tank for 20 liters of concentrated sulfuric acid (98%) to which 4 kV of static potential was loaded by the static loader 21. The characteristic removal of the static charge of sulfuric acid was determined by the electrometer in the case of natural discharge (without grounding) and in the case of discharge when the vessel was grounded. The results are shown in FIG. 11.

(1) the natural characteristic discharge when the vessel 20 was made of polyvinyl chloride was 0.07 kV/min without any effect of grounding at the point E, (2) the natural characteristic discharge when the vessel was made of CFRPP or of stainless steel was 0.05 to 0.07 kV/min, however, on grounding at the point, discharge of accumulated static charge was immediately and completely carried out, and no difference was recorded by an automatically working pen between the situations of using CFRPP and stainless steel as the material of the vessel. In other words, it was verified that CFRPP showed the same degree of removal of static charge as that of 18-8 chromium-nickel stainless steel.

As has been described above, it can be said that the high polymeric composite material comprising carbon fibers, carbon black and polypropylene according to the present invention is suitable as the material for constructing the wall of a tower for drying gaseous chlorine generating from electrolysis of sodium chloride from the view points of chemical corrosion resistance and of characteristic removal of static electrical charge.

The constitution and effect of the present invention will be concretely explained while referring to Examples in a model plant as follows.

EXAMPLE

Figure 12:
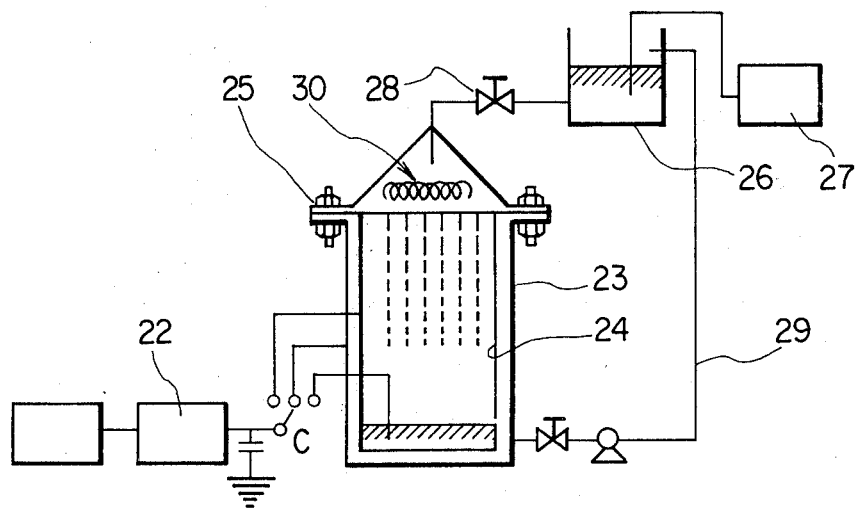

FIG. 12 shows the whole setup of the model apparatus used in Example. Model tower 23 (for drying gaseous chlorine) is made of polyvinyl chloride of 500 mm in internal diameter and 2000 mm in height containing a top-less vessel 24 made of CFRPP of 490 mm in external diameter and 1950 mm in height therewithin, the top-less vessel 24 being removable to outside of the tower 23 when the frange part 25 of the tower is removed.

Namely, in the case of examining the effect of CFRPP as the wall material of the tower for drying gaseous chlorine, the test was carried out in the same state as is shown in FIG. 12, and on the other hand, in the case of examining the effect of polyvinyl chloride as the wall material, the test as carried out, after removal of the top-less vessel 24 from the model tower 23, on the model tower 23.

Concentrated sulfuric acid was charged in the static charge loading vessel 26 until the potential became 5 to 10 kV from the source of direct voltage 27 and, via the valve 28, flowed down within the tower 23 as droplets by means of dispenser 30. Concentrated sulfuric acid accumulating on the bottom of the tower 23 is recycled to the vessel 26 by the line 29. After operating the system for a few hours, the situation of the static charge on sulfuric acid accumulated on the bottom of the tower 23 or the top-less vessel 24 was surveyed to find:

(1) the electrically charged concentrated sulfuric acid was partially atomized to form electrically charged clouds while flowing down as droplets and partially adhered to the wall of the tower (in the actual operation of the tower for drying gaseous chlorine, the charge occurrs on the droplets of sulfuric acid while falling down), and (2) in the case when the top-less vessel was removed, that is, the tower made of polyvinyl chloride is actually used for the purpose, the charge of sulfuric acid at the bottom of the tower was not removed. Accordingly, it was presumed that the static charge on the mist of sulfuric acid floating within the space of the tower and adhering on the side wall of the tower would not be removed resulting in a large amount of accumulated charge with a risk of spark discharge.

On the other hand, in the case where the top-less vessel 24 was set in the tower 23 as in FIG. 12, that is, the vessel 24 made of CFRPP is used as the tower for the purpose, the charge of concentrated sulfuric acid on the bottom of the vessel 24 and on the side wall of the vessel could be removed completely by grounding the vessel 24.

Accordingly, the effectiveness of the present invention was clearly demonstrated.

What is claimed is:

1. A tower for drying gaseous chlorine, comprised off a high polymeric composite material wherein said composite material is comprised of 10% to 30% by weight of carbon fibers, 5% to 20% by weight of electroconductive carbon black, and 50% to 85% by weight of a polymeric matrix, wherein said polymeric matrix is comprised of 5% to 25% by weight of modified polypropylene and 75% to 95% by weight of polypropylene; said tower also having electrical grounding means associated therewith.

2. A tower according to claim 1 wherein said modified polypropylene is prepared by copolymerizing propylene and an unsaturated carboxylic acid of three to ten carbon atoms, or by treating polypropylene with said unsaturated carboxylic acid.

3. A tower for drying gaseous chlorine comprised of an exterior wall of a non-electroconductive material lined with a high polymeric composite material, said lining comprising the interior surface of said tower, wherein said high polymeric composite material comprises 10% to 30% by weight of carbon fibers, 5% to 20% by weight of electroconductive carbon black, and 50% to 85% by weight of a polymeric matrix, said polymeric matrix being comprised of 5% to 25% by weight of modified polypropylene and 75% to 95% by weight of polypropylene, said tower also having grounding means associated therewith.

4. The tower according to claim 3 wherein said exterior wall is comprised of polyvinyl chloride.

5. A tower according to claim 3 wherein said modified polypropylene is prepared by copolymerizing propylene and an unsaturated carboxylic acid of three to ten carbon atoms, or by treating polypropylene with said unsaturated carboxylic acid.

* * * * *

UNITED STATES PATENT AND TRADEMARK OFFICE
CERTIFICATE OF CORRECTION

PATENT NO. : 4,404,171

DATED : September 13, 1983

INVENTOR(S) : Hiroaki Satoh, Yasuyuki Tabata, Kouichi Gomikawa Masaru Hiruta

It is certified that error appears in the above—identified patent and that said Letters Patent is hereby corrected as shown below:

In column 3, line 32, delete "and" and insert --to--.

In column 6, line 61, delete "dispenser" and insert --disperser--.

Signed and Sealed this

Twenty-fourth Day of April 1984

[SEAL]

*Attest:*

GERALD J. MOSSINGHOFF

*Attesting Officer*     *Commissioner of Patents and Trademarks*